United States Patent [19]

Gilbert

[11] Patent Number: 4,944,565

[45] Date of Patent: Jul. 31, 1990

[54] HYDRAULIC BRAKE CIRCUIT FOR A MOTOR VEHICLE EQUIPPED WITH WHEEL ANTI-LOCK AND ANTI-SLIP DEVICES

[75] Inventor: Kervagoret Gilbert, Argenteuil, France

[73] Assignee: Bendix France, Drancy, France

[21] Appl. No.: 355,527

[22] Filed: May 22, 1989

[30] Foreign Application Priority Data

Jun. 15, 1988 [FR] France ............................... 88 07996

[51] Int. Cl.⁵ ........................... B60T 8/32; B60T 8/48; B60T 13/14

[52] U.S. Cl. .................................. 303/110; 303/119; 303/116

[58] Field of Search ............... 303/10, 100, 113, 114, 303/115, 116, 119, 110; 188/181 A; 180/197

[56] References Cited

U.S. PATENT DOCUMENTS

| | | | |
|---|---|---|---|
| 4,416,347 | 11/1983 | Bertling et al. | 303/110 X |
| 4,509,802 | 4/1985 | Solleder | 303/110 |
| 4,826,256 | 5/1989 | Von Hayn et al. | 303/115 X |
| 4,861,116 | 8/1989 | Bernhardt et al. | 303/110 X |

FOREIGN PATENT DOCUMENTS

| | | |
|---|---|---|
| 0283332 | 9/1988 | European Pat. Off. . |
| 3137286 | 4/1983 | Fed. Rep. of Germany . |
| 2119883 | 11/1983 | United Kingdom ................ 303/119 |

Primary Examiner—Douglas C. Butler
Attorney, Agent, or Firm—Larry J. Palguta; Ken C. Decker

[57] ABSTRACT

In a hydraulic brake circuit for a motor vehicle equipped with a wheel anti-lock device and with a wheel anti-slip device, a solenoid anti-slip valve (48) is located in a conduit (26) connecting the master cylinder (12) to the wheel brakes (10), upstream of a solenoid relief valve (34) controlled by the computer of the anti-lock device. When a risk of slipping of the wheels is detected, the solenoid anti-slip valve (48) is energized and a pump (40) associated with the anti-lock device is actuated. In the absence of any actuation of the brake pedal (14), the brakes (10) are thus actuated automatically by way of the pump (40) which sucks up the brake fluid contained in the tank (28) of the master cylinder (12) via the solenoid anti-slip valve (48).

5 Claims, 1 Drawing Sheet

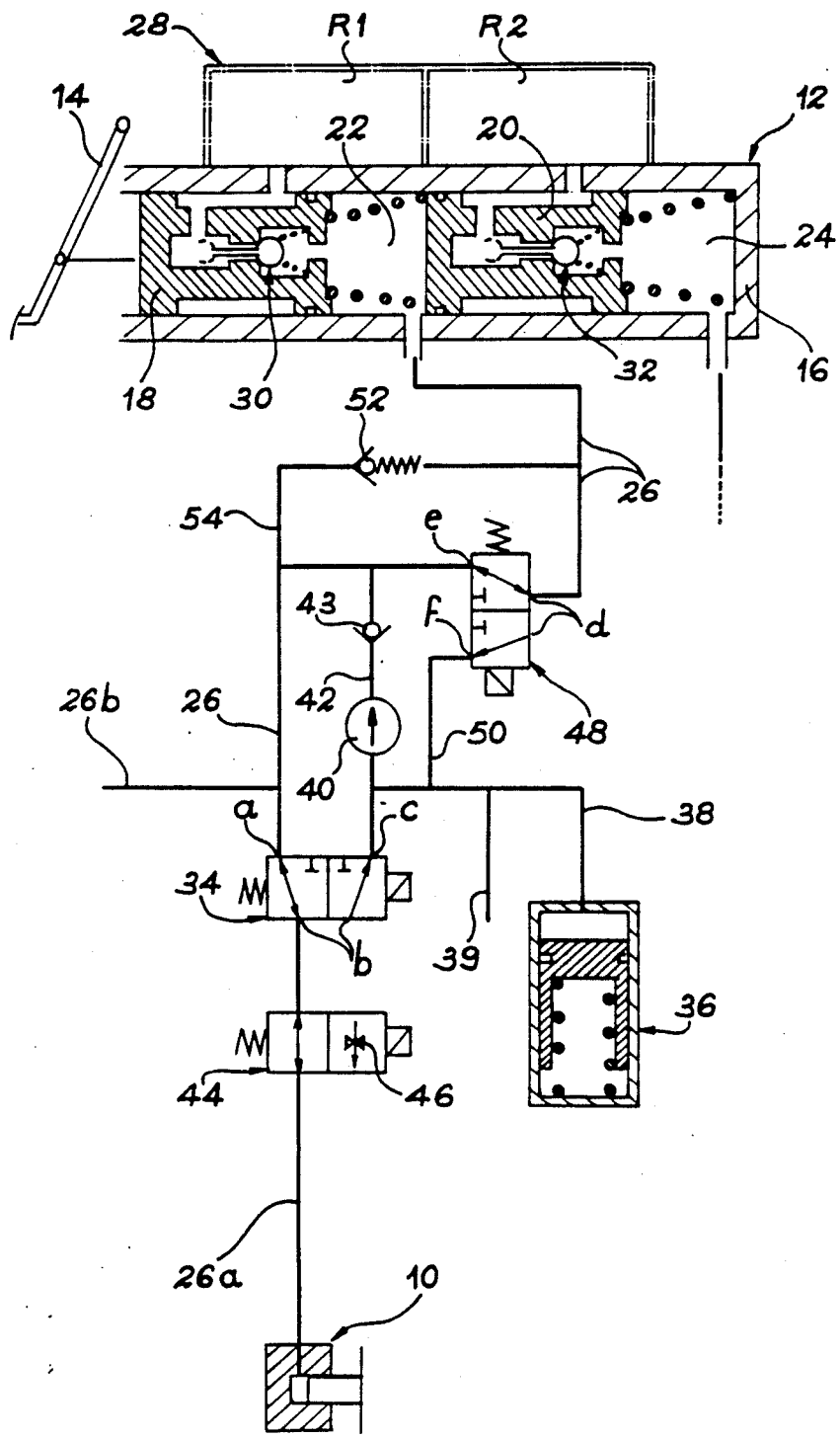

HYDRAULIC BRAKE CIRCUIT FOR A MOTOR VEHICLE EQUIPPED WITH WHEEL ANTI-LOCK AND ANTI-SLIP DEVICES

The invention relates to a hydraulic brake circuit for a motor vehicle equipped with a wheel anti-lock device and with a wheel anti-slip device.

More specifically, the invention is concerned with a hydraulic brake circuit, the components of which are those of a conventional hydraulic brake circuit to which additional components have been added, making it possible to control this conventional circuit by means of an anti-lock device for the wheels of the vehicle. According to the invention, other components are added to the hydraulic brake circuit so modified, so that this circuit can also be controlled by means of an anti-slip device for the wheels of the vehicle.

The conventional brake circuit of a motor vehicle comprises a master cylinder controlled by a brake pedal via a booster, and wheel brakes which communicate directly with the master cylinder.

When the vehicle is to be equipped with a wheel anti-lock device, to prevent the wheels from locking during a braking action, a useful solution involves adding additional members to the conventional hydraulic brake circuit. These additional members are controlled by the computer of the anti-lock device, when the latter detects an imminent locking of the wheels during a braking phase, by means of sensors associated with each of the wheels of the vehicle.

Thus, EP-A-0,283,332 described a conventional hydraulic brake circuit, into which a solenoid relief valve, a pump and a low-pressure accumulator in particular were introduced, so that this circuit can be controlled by an antilock device eliminating any risk of locking of the wheels during braking. In this circuit, the solenoid relief valve is interposed between the master cylinder and the wheel brakes and allows the brake fluid to pass between these members when it is not energized. The effect of the energization of the solenoid valve, which occurs as soon as the computer of the anti-lock device detects an imminent locking of the wheels, is to break communication between the master cylinder and the wheel brakes and put the latter in communication with the low-pressure accumulator and with the suction port of the pump. The latter, which is likewise actuated as soon as the computer detects an imminent locking of the wheels, makes it possible to return the brake fluid from the low-pressure accumulator towards the wheel brakes via the solenoid relief valve as soon as the latter is de-energized.

When an imminent locking of the wheels is detected by the computer, the pressure in the wheel brakes thus changes according to a sawtooth curve formed alternately from relief phases corresponding to the periods of energization of the solenoid valve and from pressure increase phases corresponding to the periods during which the solenoid valve is de-energized.

In a conventional hydraulic brake circuit equipped with the abovementioned additional members controlled by a wheel anti-lock device, an object of the invention is also to make it possible to control the brake circuit by means of a wheel anti-slip device, using some of the existing components and adding to them a very small number of additional components.

More specifically, the subject of the invention is a hydraulic brake circuit designed both to prevent any risk of locking of the wheels during braking phase and to prevent any risk of slipping or skidding of the wheels outside the braking phases, without the members of a conventional hydraulic brake circuit equipped with additional members controlled by a wheel anti-lock device being modified, and without substantially increasing the complexity of the circuit.

To achieve this, the invention provides a hydraulic brake circuit for a motor vehicle equipped with a wheel anti-lock device and with a wheel antislip device, this circuit comprising a master cylinder controlled by means of a brake pedal, at least one brake associated with a wheel of the vehicle, a solenoid relief valve via which the master cylinder normally communicates with the brake, an actuation of this solenoid valve controlled by the anti-lock device putting the brake in communication with brake-fluid storage means, and a pump of which an actuation controlled by the anti-lock device delivers the brake fluid from the storage means to the brake via the solenoid relief valve when the latter is not actuated, this circuit being characterized in that it comprises, furthermore, a solenoid anti-slip valve which is located upstream of the solenoid relief valve and via which the master cylinder normally communicates with the brake, an actuation of the solenoid anti-slip valve controlled by the anti-slip device putting the master cylinder in communication with a suction port of the pump, the actuation of which is likewise controlled by the anti-slip device.

Of course, the wheel anti-lock device and the wheel anti-slip device have in common the sensors associated with the wheels of the vehicle and, according to circumstances, they can comprise either two separate computers or a single computer.

In the hydraulic brake circuit Just defined, as long as an imminent slip of the wheels of the vehicle is not detected by the computer of the anti-slip device, the solenoid anti-slip valve allows the brake fluid to circulate freely between the master cylinder and the wheel brakes via the solenoid relief valve. The functioning of the circuit is therefore not modified during the braking phases, whether the anti-lock device detects a risk of locking of the wheels or not.

In contrast, when the wheel anti-slip device detects an imminent skidding of the wheels, the solenoid anti-slip valve is energized and the pump is actuated. The master cylinder then communicates with the brakes of the vehicle via the pump. On the assumption that the brake pedal is not actuated, the brake fluid contained in the tank of the master cylinder is then sucked up by the pump and delivered to the brakes, so that an action to brake the wheels is automatically exerted until the risk of skidding of these, likewise detected by the computer, has disappeared.

In order to protect the pump, a means for limiting the pressure difference between a delivery port and the suction port of the latter is preferably provided. This limitation means can consist, in particular, of a calibrated non-return valve located in a branched circuit connected, on the one hand, between the master cylinder and the solenoid anti-slip valve and, on the other hand, between a delivery port of the pump and the solenoid relief valve. The invention will now be described by way of example with reference to the accompanying drawing in which the single figure shows diagrammatically a hydraulic brake circuit according to the invention. More specifically, this circuit comprises two identical half-circuits, only one of which is shown in order to make understanding easier.

Each of the half-circuits separately controls the braking of two crossed wheels of the vehicle. Thus, the half-circuit shown in the figure controls, for example, the brake 10 of the left-hand front wheel and the brake (not shown) of the right-hand rear wheel of the vehicle, while the other half-circuit circuit (not shown) controls the brake of the right-hand front wheel and of the left-hand rear wheel.

The hydraulic brake circuit according to the invention comprises a tandem master cylinder 12 similar to that which usually equips conventional hydraulic brake circuits. This tandem master cylinder 12 is controlled by means of a brake pedal 14, usually via a brake booster (not shown).

Since the structure of the master cylinder 12 is of conventional design, it will not be described in detail here. To make the invention easy to understand, it will simply be recalled that this master cylinder comprises a cylindrical body 16, in which are mounted end to end and slideably two pistons 18 and 20, of which a movement controlled by the brake pedal 14 has the effect of reducing the volume of two control chambers 22 and 24 respectively. The chamber 22 belonging to the half-circuit shown in the figure communicates with a conduit 26 which is subdivided into two branches 26a and 26b for supplying separately the brake 10 of the front wheel and the brake (not shown) of the rear wheel belonging to this half-circuit. On the contrary, the chamber 24 belongs to the second half-circuit (not shown).

In a conventional way, a double tank 28 is associated with the master cylinder 12, in such a way that each of the tanks R1 and R2 of this double tank 28 communicates respectively with the chamber 22 and with the chamber 24 via a passage extending through the piston 18, 20 and controlled by means of a valve 30, 32 respectively. The valves 30 and 32 are designed so as to close automatically when a braking action is exerted on the pedal 14, so that the brake fluid contained in the chambers 22 and 24 is forced towards the corresponding brakes. In contrast, when the brake pedal 14 is released, the valves 30 and 32 are opened, in such a way that the brake fluid can return freely to the tanks R1 and R2.

The conventional brake circuit just described in brief is equipped, furthermore, with various members designed to be controlled by an anti-lock device (not shown), in order to prevent the possibility of a locking of the wheels of the vehicle occurring during an actuation of the brake pedal 14.

These various members comprise first of all, for the half-circuit shown, a solenoid relief valve 34. This solenoid relief valve has an inlet port a, an outlet port b and a relief port c. It is located in the branch 26a of the conduit 26, in such a way that its inlet port a communicates with the chamber 22 of the master cylinder and its outlet port b communicates with the brake 10. The solenoid relief valve 34, when it is not energized, occupies a first position in which the inlet port a and the outlet port b communicate directly with one another, the relief port c being isolated. On the contrary, when the solenoid valve 34 is energized, communication between the ports a and b is broken and the latter port communicates with the relief port c.

The members associated with the anti-lock device likewise comprise a low-pressure accumulator 36 which communicates directly with the relief port c of the solenoid valve 34 via a conduit 38. Moreover, an electric pump 40 is arranged in a conduit 42 designed in such a way that the suction port of the pump communicates both with the low-pressure accumulator 36 and with the relief port c of the solenoid valve 34 and that the delivery port of this pump is connected to the conduit 26 upstream of the solenoid valve 34.

A non-return valve 43 is located in the conduit 42 between the delivery port of the pump 40 and the conduit 26, in order to prevent any circulation of brake fluid from the latter conduit towards the pump 40.

The hydraulic brake half-circuit shown, to allow it to function in association with an anti-lock device, also possesses a second solenoid valve 44. This solenoid valve 44 is located in the branch 26a of the conduit 26 between the solenoid relief valve 34 and the wheel brake 10. When it is not energized, it allows direct communication between the outlet port b of the solenoid relief valve 34 and the brake 10. On the contrary, the effect of the energization of the solenoid valve 44 is to interpose a restriction 46 between the outlet port b of the solenoid relief valve 34 and the brake 10.

The members associated with the anti-lock device (not shown) mounted on the vehicle likewise comprise, in the half-circuit shown partially in the figure, at least one second solenoid relief valve (not shown) which is mounted in the same way as the solenoid valve 34 in the branch 26b of the conduit 26 and the relief port of which communicates with the accumulator 36 via a conduit 39. A solenoid valve (not shown) comparable to the solenoid valve 44 can also be mounted in the branch 26b of the conduit 26.

The functioning of a hydraulic brake circuit equipped with the solenoid valves 34 and 44, with the pump 40 and with the low-pressure accumulator 36 is known and does not form part of the invention.

As a reminder, it is recalled that this functioning is characterized by a succession of relief and pressure increase phases when a risk of locking of the wheels is detected by the anti-lock device. During the operating period of the anti-lock device, the pump 40 is actuated. The relief phases are characterized by an energization of the solenoid relief valves 34, allowing the brake fluid to be discharged from the brakes towards the low-pressure accumulator 36 more easily. During the phases of an increase in the brake pressure, the solenoid relief valves 34 are de-energized and the solenoid valve or solenoid valves 44 are energized or not (depending on the particular features of the anti-lock device), in such a way that the pump 40 then delivers the brake fluid contained in the accumulator 36 towards the brakes 10 via the solenoid valve or solenoid valves 34.

According to the invention, the hydraulic brake circuit just described is essentially completed by the addition of a solenoid anti-slip valve 48, so that this circuit allows, apart from any actuation of the brake pedal 14, an automatic actuation of the wheel brakes 10 when a risk of skidding or slipping of the vehicle wheels on the ground is detected by a wheel anti-slip device likewise mounted on this vehicle.

The invention is not concerned with the actual anti-slip device composed essentially of a computer which is sensitive to the signals supplied by the wheel sensors of the anti-lock device and which, as has been seen, can be independent of the computer of the latter device or associated with this computer.

As illustrated in the figure, the solenoid anti-slip valve 48 is located in the conduit 26 between the chamber 22 of the master cylinder and the inlet port a of each of the solenoid relief valves 34. More specifically, the solenoid anti-slip valve 48 comprises an inlet port d communicating with the chamber 22 of the master cylinder via the conduit 26, an outlet port e communicating with the inlet port a of the solenoid valve 34 via the conduit 26 before the latter is divided into two branches 26a and 26b, and a second outlet port f connected to the conduit 38 via a conduit 50, so as to communicate permanently with the suction port of the pump 40.

When the solenoid valve 48 is not energized, the inlet port d communicates with the first outlet port e in such a way that the functioning of the above-described hydraulic brake circuit remains unchanged. Under these conditions, the second outlet port f remains isolated from the ports d and e.

When the solenoid anti-slip valve 48 is energized, communication between the ports d and e is broken and the inlet port d is put in communication with the second outlet port f. Consequently, the above-described hydraulic brake circuit is then branched off by means of the solenoid valve 48 via the pump 40.

When the computer of the anti-slip device detects an imminent skidding of the wheels of the vehicle, it simultaneously commands the energization of the solenoid valve 48 and the actuation of the pump 40. By assumption, this situation occurs when the brake pedal 14 is not actuated, so that the valve 30 then allows communication between the tank RI and the control chamber 22. The solenoid valves 34 and 44 are likewise energized according to a cycle which is determined by the computer and which does not form part of the invention.

The pump 40, which is then in the circuit connecting the chamber 22 of the master cylinder to the wheel brake 10 via the solenoid valves 34 and 44, therefore sucks up the brake fluid from the tank RI in order to deliver it to the wheel brakes 10. A braking action is thus performed automatically and continues until the risk of skidding of the wheels, detected by the computer of the anti-slip device, has disappeared.

Simply by adding the solenoid valve 48 and without modifying the conventional hydraulic brake circuit equipped with the additional members controlled by the anti-lock device, the additional anti-slip function for the wheels of the vehicle is thus ensured, when the latter is also equipped with a wheel anti-lock device.

Preferably, to allow for the fact that, when it functions under anti-slip conditions, the pump 40 sucks directly from the tank R1 of the master cylinder, there is also provided in the circuit a means making it possible to limit the pressure difference between the delivery port and the suction port of this pump.

In the embodiment shown, this means for limiting the pressure difference comprises a calibrated non-return valve 52 located in a branch conduit 54 connected to the conduit 26, on the one hand between the chamber 22 of the master cylinder and the inlet port d of the solenoid valve 48 and on the other hand between the delivery port of the pump 40 and the inlet port a of the solenoid relief valve 34.

In an alternative embodiment (not shown), the calibrated non-return valve is mounted directly in parallel on the pump 40 and connected to the conduit 42.

As already mentioned above, the hydraulic brake circuit according to the invention comprises a half-circuit completely identical to that just described, making it possible to control the brakes of the other two wheels of the vehicle from the chamber 24 of the master cylinder by using the brake fluid contained in the tank R2. Of course, the invention is not limited to the embodiment just described, but embraces all its alternative versions. In particular, the solenoid anti-slip valve 48 can be associated with a hydraulic brake circuit, of which the members controlled by the anti-lock device are slightly different from those described, provided that this circuit comprises a solenoid relief valve, a low-pressure accumulator and a pump which are arranged in the way described. Thus, the solenoid valve 44 can be omitted or replaced by a valve of another type which performs the same function. Moreover, the circuit can include additional and, in some cases, more complex members.

Furthermore, the circuit described is a crossed circuit, in which a tandem master cylinder controls separately brakes associated with two crossed wheels of the vehicle. However, the invention is not limited to this type of circuit and also applies to a circuit comprising a simple master cylinder directly controlling the four wheels of the vehicle and to a circuit comprising a tandem master cylinder controlling two half-circuits designed differently, on the understanding that the solenoid valve 48 is necessary only if the circuit in question comprises least one driving-wheel brake.

I CLAIM :

1. A hydraulic brake circuit for motor vehicle equipped with a wheel anti-lock device and with a wheel anti-slip device, the circuit comprising:

a master cylinder controlled by means of a brake pedal, at least one brake associated with a wheel of the vehicle, a solenoid relief valve via which the master cylinder normally communicates with the brake, an actuation of said solenoid relief valve controlled by the anti-lock device putting the brake in communication with brake-fluid storage means, a pump of which an actuation controlled by the anti-lock device delivers brake fluid from the storage means to the brake via the solenoid relief valve when said solenoid relief valve is not actuated, a solenoid anti-slip valve which is located upstream of said solenoid relief valve and via which the master cylinder normally communicates with the brake, wherein an actuation of the solenoid anti-slip valve controlled by the anti-slip device putts the master cylinder in communication with a suction port of the pump, the actuation of which is likewise controlled by the anti-slip device.

2. The circuit according to claim 1, wherein the solenoid anti-slip valve has an inlet port connected to the master cylinder and communicating with a first outlet port connected to an inlet port of the solenoid relief valve when the solenoid anti-slip valve is de-energized, and with a second outlet port connected to the suction port of the pump when the solenoid anti-slip valve is energized.

3. The circuit according to claim 1, wherein a means for limiting the pressure difference between a delivery port and the suction port of the pump is provided.

4. The circuit according to claim 3, wherein said limiting means is a calibrated non-return valve located in a branched circuit connected on one side between the master cylinder and the solenoid anti-slip valve and, on the other side between a delivery port of the pump and the solenoid relief valve.

5. The circuit according to claim 4, wherein the master cylinder is a tandem master cylinder controlling separately brakes associated with two crossed wheels of a vehicle with four wheels, by means of two identical half circuits each comprising a respective solenoid relief valve, pump, storage means for the brake fluid, and solenoid anti-slip valve.

* * * * *